(12) United States Patent
Angadjivand et al.

(10) Patent No.: US 10,245,537 B2
(45) Date of Patent: Apr. 2, 2019

(54) MOLDED RESPIRATOR HAVING OUTER COVER WEB JOINED TO MESH

(75) Inventors: Seyed A. Angadjivand, Woodbury, MN (US); John M. Brandner, St. Paul, MN (US); Nhat Ha T. Nguyen, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 1812 days.

(21) Appl. No.: 13/465,827

(22) Filed: May 7, 2012

(65) Prior Publication Data

US 2013/0291876 A1 Nov. 7, 2013

(51) Int. Cl.
| | |
|---|---|
| A62B 23/02 | (2006.01) |
| B01D 39/16 | (2006.01) |
| B29C 43/20 | (2006.01) |
| B01D 39/08 | (2006.01) |
| A41D 13/11 | (2006.01) |
| B29L 31/48 | (2006.01) |
| B29C 65/08 | (2006.01) |
| B29L 31/14 | (2006.01) |
| B29C 65/00 | (2006.01) |

(52) U.S. Cl.
CPC ........ *B01D 39/1623* (2013.01); *A62B 23/025* (2013.01); *B01D 39/083* (2013.01); *B29C 43/203* (2013.01); *A41D 13/1138* (2013.01); *B01D 2239/0435* (2013.01); *B01D 2239/065* (2013.01); *B29C 65/08* (2013.01); *B29C 66/545* (2013.01); *B29C 66/723* (2013.01); *B29C 66/73115* (2013.01); *B29L 2031/14* (2013.01); *B29L 2031/4835* (2013.01)

(58) Field of Classification Search
CPC ........... A62B 7/00; A62B 23/00; A62B 23/02; A62B 23/025; A62B 18/00; A62B 18/02; A41D 1/00; A41D 13/00; A41D 13/05; A41D 13/11; A41D 13/1161
USPC ............ 128/205.25, 206.12, 206.13, 206.19, 128/206.21, 846, 857, 863
See application file for complete search history.

(56) References Cited

U.S. PATENT DOCUMENTS

| | | |
|---|---|---|
| 4,215,682 A | 8/1980 | Kubik |
| 4,374,888 A | 2/1983 | Bornslaeger |
| | (Continued) | |

FOREIGN PATENT DOCUMENTS

| | | |
|---|---|---|
| CN | 201052347 | 4/2008 |
| CN | 201067099 | 6/2008 |
| | (Continued) | |

OTHER PUBLICATIONS

International Application No. PCT/US2013/037293 Search Report dated Jul. 24, 2013.

(Continued)

*Primary Examiner* — Keri J Nelson (57) ABSTRACT

A respirator 10 that has a mask body 12 and a harness 14 that is attached to the mask body 12. The mask body 12 includes a filtering structure 18 that has an inner cover web 40*a*, an outer cover web 40*b* that comprises melt-blown fibers and staple fibers, and a filtration layer 42 that is located between the inner and outer cover webs 40*a,* 40*b*. The mask body 12 also has a mesh 20 that is joined to the outer cover web 40*b*. A respirator having this construction is more resistant to inward collapse of the filter media during breathing and is more aesthetically pleasing.

20 Claims, 2 Drawing Sheets

(56) References Cited

U.S. PATENT DOCUMENTS

| | | |
|---|---|---|
| 4,547,420 A | 10/1985 | Krueger |
| 4,729,371 A | 3/1988 | Krueger |
| 4,850,347 A * | 7/1989 | Skov .................. A41D 13/1146 128/206.16 |
| 4,923,454 A | 5/1990 | Seymour |
| 5,035,240 A | 7/1991 | Braun |
| 5,307,796 A | 5/1994 | Kronzer |
| 5,441,550 A | 8/1995 | Hassenboehler, Jr. |
| 5,443,606 A | 8/1995 | Hassenboehler, Jr. |
| 5,470,485 A | 11/1995 | Morweiser |
| 5,498,463 A | 3/1996 | McDowall |
| 6,041,782 A | 3/2000 | Angadjivand |
| 6,057,256 A | 5/2000 | Krueger |
| 6,537,660 B2 | 3/2003 | Katayama |
| 6,613,704 B1 | 9/2003 | Arnold |
| 6,827,764 B2 | 12/2004 | Springett |
| 7,228,858 B2 | 6/2007 | Baker |
| 7,452,832 B2 | 11/2008 | Bansal |
| 7,902,096 B2 | 3/2011 | Brandner |
| 2005/0217037 A1 | 10/2005 | Negola |
| 2006/0003657 A1 | 1/2006 | Larson |
| 2007/0051370 A1 | 3/2007 | Baker |
| 2007/0134478 A1 | 6/2007 | Haberer |
| 2008/0057534 A1 | 3/2008 | Martin |
| 2008/0318014 A1 | 12/2008 | Angadjivand |
| 2008/0318024 A1 | 12/2008 | Angadjivand |
| 2009/0133810 A1 | 5/2009 | Penalva |
| 2010/0051031 A1 | 3/2010 | Lustenberger |
| 2010/0248299 A1 | 9/2010 | Lye |
| 2011/0074060 A1 | 3/2011 | Angadjivand |
| 2011/0155137 A1 | 6/2011 | Martin |
| 2012/0017911 A1 | 6/2012 | Choi |
| 2013/0291877 A1 | 11/2013 | Nguyen |

FOREIGN PATENT DOCUMENTS

| | | |
|---|---|---|
| CN | 101285220 A | 10/2008 |
| CN | 201668009 | 12/2010 |
| JP | 3130454 | 6/1991 |
| JP | 3167362 | 7/1991 |
| JP | 200625847 | 2/2006 |
| JP | 2008088610 | 4/2008 |
| JP | 2009185418 | 8/2009 |
| JP | 2010184095 | 8/2010 |
| JP | 2010242255 | 10/2010 |
| KR | 20090020997 | 2/2009 |
| WO | WO 2008/009651 | 1/2008 |

OTHER PUBLICATIONS

Flexinet™ Disposable Mask FFP2-823 Odour Valved website information obtained from internet on Nov. 14, 2012, http://www.jsp.co.uk/products/respiratory-protection/Disposable-Masks/BER152-201-000_Flexinet-Disposable-Mask-FFP2-823-Odour-Valved-(Medium-Large).

Moldex HandyStrap® Respirator website information obtained from internet on Nov. 14, 2012, http://www.moldex.com/respiratory-protection/disposable-respirators/handystrap/index.php.

Shanghai Dasheng Health Co. Ltd. DTCA1N-F N99 Valved Net-Particulate Respirator website information obtained from internet on Nov. 14, 2012, http://a10751023.designer.mynet.cn/_d275209211.htm.

European Application No. 13788550 Search Report dated Dec. 8, 2015.

* cited by examiner

MOLDED RESPIRATOR HAVING OUTER COVER WEB JOINED TO MESH

The present invention pertains to a respirator mask body that has an outer cover web joined to a mesh structure.

BACKGROUND

Respirators are commonly worn over the breathing passages of a person for at least one of two common purposes: (1) to prevent impurities or contaminants from entering the wearer's respiratory system; and (2) to protect other persons or things from being exposed to pathogens and other contaminants exhaled by the wearer. In the first situation, the respirator is worn in an environment where the air contains particles that are harmful to the wearer, for example, in an auto body shop. In the second situation, the respirator is worn in an environment where there is risk of contamination to other persons or things, for example, in an operating room or clean room.

Some respirators are categorized as being "filtering face-pieces" because the mask body itself functions as the filtering mechanism. Unlike respirators that use rubber or elastomeric mask bodies in conjunction with attachable filter cartridges or filter liners (see, e.g., U.S. Pat. RE39,493 to Yuschak et al. and U.S. Pat. No. 5,094,236 to Tayebi) or insert-molded filter elements (see, e.g., U.S. Pat. No. 4,790,306 to Braun), filtering face-piece respirators have the filter media extend integrally throughout the whole mask body so that there is no need for installing or replacing a filter cartridge. As such, filtering face-piece respirators are relatively light in weight and easy to use.

Filtering face-piece respirators generally fall into one of two categories, namely, flat-fold respirators and shaped respirators. Flat-fold respirators are stored flat but include seams, pleats, and/or folds that allow the mask to be opened into a cup-shaped configuration for use. Examples of flat-fold filtering face-piece respirators are shown in U.S. Pat. Nos. 6,568,392 and 6,484,722 to Bostock et al. and 6,394,090 to Chen.

Shaped respirators, in contrast, are more-or-less permanently formed into a desired face-fitting configuration and generally retain that configuration during storage and use. Shaped filtering face-piece respirators regularly include a molded supporting shell structure, generally referred to as a "shaping layer", which is commonly made from thermally bonding fibers or an open-work plastic mesh. The shaping layer is primarily designed to provide support for a filtering structure. Relative to the filtering structure, the shaping layer may reside on an inner portion of the mask (adjacent to the face of the wearer), or it may reside on an outer portion of the mask, or on both inner and outer portions. Examples of patents that disclose shaping layers for supporting filtration layers include U.S. Pat. No. 4,536,440 to Berg, U.S. Pat. No. 4,807,619 to Dyrud et al., and U.S. Pat. No. 4,850,347 to Skov.

In constructing a mask body for a shaped filtering face-piece respirator, the filtration layer is typically juxtaposed against the shaping layer, and the assembled layers are subjected to a molding operation by placing the assembled layers between heated male and female mold parts (see, for example, U.S. Pat. No. 4,536,440 to Berg) or by passing the layers in superimposed relation through a heating stage and thereafter cold molding the superimposed layers into the face mask shape (see U.S. Pat. No. 5,307,796 to Kronzer et al. and U.S. Pat. No. 4,850,347 to Skov). The filtration layer generally assumes the curved configuration of the molded shaping layer.

Figure 1:
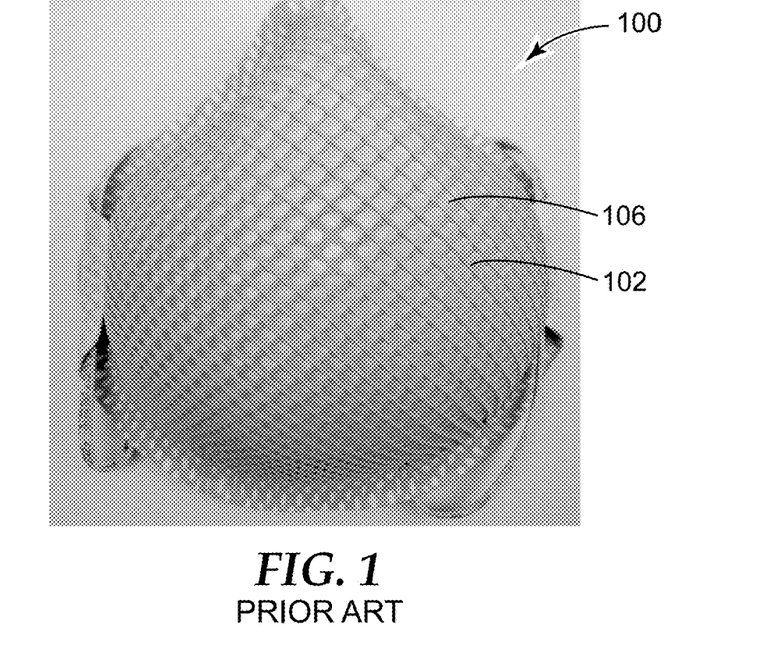
FIG. 1 is a photograph taken from the front of a prior art filtering face-piece respirator 100.
Figure 2:
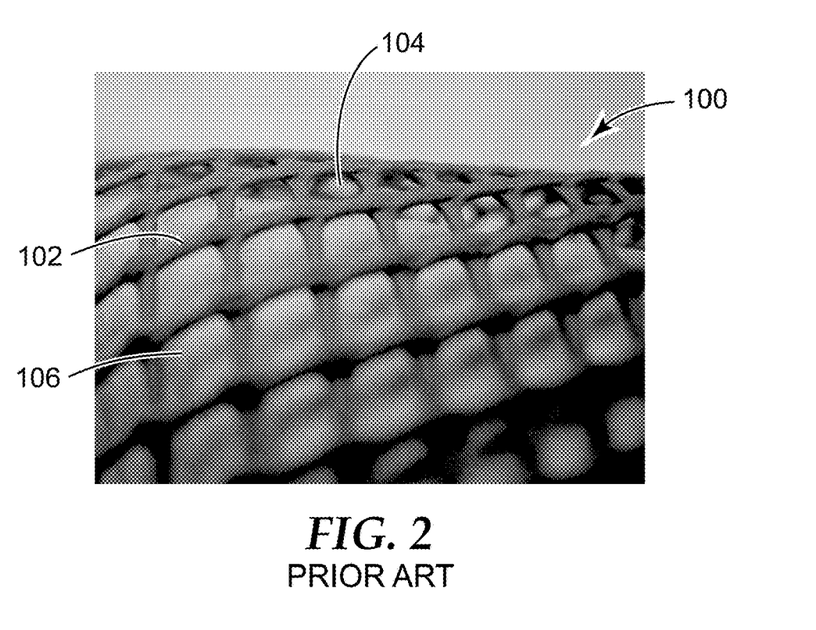
FIG. 2 is an enlarged photograph of a prior art respirator 100 taken from the side.

When a shaping layer is made from a plastic mesh like the filtering face-piece respirator described in the '347 patent to Skov, the shaping layer or mesh generally resides in a spaced or unjoined relationship to the filtering structure except at the mask perimeter and where a valve is mounted to the mask body. FIG. 1 shows a known respirator 100 that has a mesh 102 as a supporting structure. FIG. 2 shows that there is a gap 104 that commonly resides between the mesh 102 and the filtering structure 106. The unjoined relationship 104 between the mesh 102 and the filtering structure 106 does not allow for the filtering structure 106 to be fully supported by the mesh 102 such that the filtering structure 106 remains juxtaposed against the mesh 102 over the whole surface of the mask body. As such, opportunities exist for the filtering structure to be pulled inwardly, particularly when the wearer inhales and the mask has been exposed to high levels of humidity or moisture for an extended time period. The failure of the filtering structure to closely follow the outer mesh also leaves an appearance that is generally unsightly. The invention described below seeks to overcome these issues or problems in the molded filtering face-piece respirator art.

SUMMARY OF THE INVENTION

The present invention provides a filtering face-piece respirator that comprises a shaped mask body and a harness. The harness is attached to the mask body. The mask body includes a filtering structure that has an inner cover web, an outer cover web that comprises melt-blown fibers and staple fibers, and a filtration layer that is located between the inner and outer cover webs. The melt-blown fibers have a first melting point. The mask body also includes a plastic mesh that is joined to the outer cover web in the mid region of the mask body. The plastic mesh contains a polymeric material that has a second melting point similar to the first melting point of the melt-blown fibers. The outer cover web may be electrically charged, that is, it may be an electret filter that assists in removing contaminants from air that passes through the mask body.

The present invention differs from known filtering face-piece respirators in that the outer cover web contains melt-blown fibers and staple fibers and is joined to the supporting mesh in the mid region of the mask body. In the present invention, the melt-blown fibers have a melting point similar to the melting point of the plastic of the mesh. In conventional filtering face-piece respirators, the mask body is only joined to the mesh at the perimeter and at the apex, and this is achieved through an ultrasonic welding operation. In the present invention, the fibers in the mask body are thermally bonded to the mesh in the mid region of the mask body. This may be achieved by using melt-blown fibers in combination with staple fibers and by having the melt-blown fibers in the outer cover web made from materials that exhibit a melting point similar to those in the mesh. This allows the two layers to be joined together during the molding operation. The use of melt-blown fibers and staple fibers in the outer cover web also allows this layer to be used as a prefilter for the filtering structure. Fibers in the outer cover web can be electrically charged to improve filtration performance. The resulting product has the mesh and filtering structure joined together such that the two layers are juxtapositioned relative to one another over essentially the whole inner surface of the mesh.

The resulting product has a pleasing appearance, and the filtering structure is more resistant to inward collapse during an inhalation.

Glossary

The terms set forth below will have the meanings as defined:

"apex region" means the area surrounding the highest point on the mask body when it is resting on a flat surface with the mask perimeter in contact with the surface;

"comprises (or comprising)" means its definition as is standard in patent terminology, being an open-ended term that is generally synonymous with "includes", "having", or "containing". Although "comprises", "includes", "having", and "containing" and variations thereof are commonly-used, open-ended terms, this invention also may be suitably described using narrower terms such as "consists essentially of", which is semi open-ended term in that it excludes only those things or elements that would have a deleterious effect on the performance of the inventive respirator in serving its intended function;

"clean air" means a volume of atmospheric ambient air that has been filtered to remove contaminants;

"coextensively" means extending parallel to;

"contaminants" means particles (including dusts, mists, and fumes) and/or other substances that generally may not be considered to be particles (e.g., organic vapors, et cetera) but which may be suspended in air, including air in an exhale flow stream;

"cover web" means a nonwoven fibrous layer that is not primarily designed for filtering contaminants or that is not the primary filtering layer;

"denier" means the weight in grams of 9,000 meters of filament;

"exterior gas space" means the ambient atmospheric gas space into which exhaled gas enters after passing through and beyond the mask body and/or exhalation valve;

"filtering face-piece" means that the mask body itself is designed to filter air that passes through it; there are no separately identifiable filter cartridges, filter liners, or insert-molded filter elements attached to or molded into the mask body to achieve this purpose;

"filter", "filtration layer", or "primary filtering layer" means one or more layers of air-permeable material, which layer(s) is adapted for the primary purpose of removing contaminants (such as particles) from an air stream that passes through it;

"filtering structure" means a construction that is designed primarily for filtering air;

"harness" means a structure or combination of parts that assists in supporting the mask body on a wearer's face;

"integral" means that the parts in question cannot be separated without compromising or destroying the structure as a whole;

"juxtaposed" or "juxtapositioned" means having the major surfaces at least in contact with each other;

"interior gas space" means the space between a mask body and a person's face;

"joined" means that at least some of the fibers in the outer cover web are thermally bonded to the mesh;

"mask body" means an air-permeable structure that is designed to fit over the nose and mouth of a person, that filters air that passes through it, and that helps define an interior gas space separated from an exterior gas space;

"melt-blown" or "melt-blowing" means formed by extruding a molten material through a plurality of orifices to form filaments while contacting the filaments with air or other attenuating fluid to attenuate the filaments into fibers, and thereafter collecting a layer of the attenuated fibers;

"melt-blown fibers" means fibers prepared by melt-blowing;

"melting point" means the temperature at which the solid is changed to a liquid;

"mesh" means a plastic web that has sufficient structural integrity to retain a desired shape after being molded, that has a network of open spaces through which air can readily pass, and that (when laid flat before being molded) is substantially larger in first and second dimensions than in a third;

"mesofiber" means fibers having an effective fiber diameter of greater than 10 micrometers;

"microfiber" means fibers having an effective fiber diameter of 1 to 10 micrometers;

"mid region" means an area between an apex region and the mask body perimeter;

"mold" means a device that is used to form a product into a desired shape or configuration though application of heat and/or pressure;

"molded" or "molding" means forming into a desired shape using heat and pressure;

"multitude" means 100 or more;

"nose clip" means a mechanical device (other than a nose foam), which device is adapted for use on a mask body to improve the seal at least around a wearer's nose;

"nonwoven" means a structure or portion of a structure in which the fibers are held together by a means other than weaving;

"parallel" means being generally equidistant;

"perimeter" means the outer edge of the mask body, which outer edge would be disposed generally proximate to a wearer's face when the respirator is being donned by a person;

"porous" means air-permeable;

"polymer" means a material that contains repeating chemical units, regularly or irregularly arranged;

"polymeric" and "plastic" each mean a material that mainly includes one or more polymers and may contain other ingredients as well;

"plurality" means two or more;

"respirator" means an air filtration device that is worn by a person on the face over the nose and mouth to provide clean air for the wearer to breathe;

"shaped", in regard to a respirator mask body, means that the mask body has been molded into a desired face-fitting configuration;

"shaping layer" and "support structure" means a layer that has sufficient structural integrity to retain its molded shape (and the shape of other layers that are supported by it) under normal handling;

"similar" in regard to melting point means the same or within 20° C. of each other;

"solidity" means the percent solids in a web;

"staple fiber" means fibers having a determinate length;

"thermally bonding (or bondable) fibers" mean fibers that bond to adjacent plastic items after being heated above their melting point and subsequently cooled;

"upstream" means located before at a point in time in moving fluid stream; and

"web" means a structure that is significantly larger in two dimensions than in a third and that is air permeable.

DETAILED DESCRIPTION OF PREFERRED EMBODIMENTS

In the practice of the present invention, a filtering face-piece respirator is provided where the mesh is joined to the filtering structure in the mid region of the mask body. The mesh and the layers that comprise the filtering structure are molded together such that fibers in an outer cover web of the filtering structure become bonded to the mesh. The outer cover web contains microfibers and staple fibers, and the microfibers have a melting point similar to the plastic material that comprises the mesh. The microfibers are bonded to the mesh filaments at points of contact between the mesh and the microfibers. A respirator having this construction exhibits a very nice appearance and is resistant to filtering structure collapse.

Figure 3:
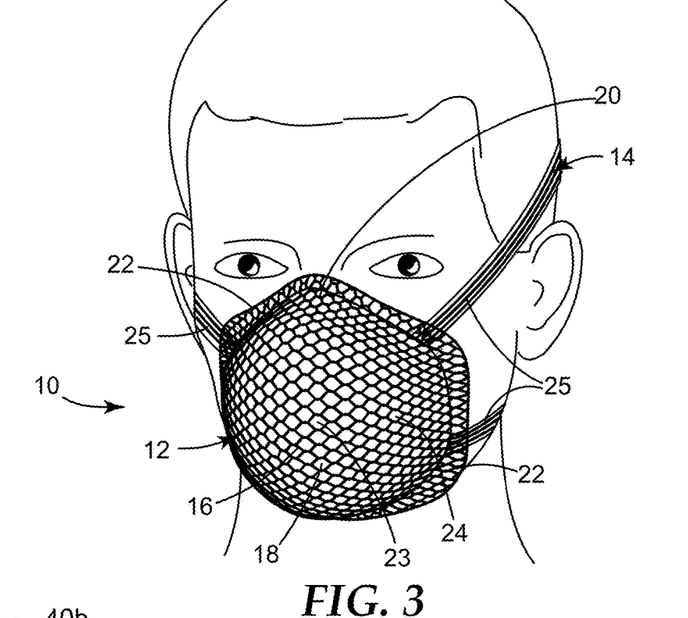
FIG. 3 is perspective view of a filtering face-piece respirator 10 of the invention being worn by a person over their nose and mouth.

FIG. 3 shows an example of a filtering face-piece respirator 10 that may be used in accordance with the present invention to provide clean air for a wearer to breathe. The filtering face-piece respirator 10 includes a mask body 12 and a harness 14. The mask body 12 has a support structure 16 that provides structural integrity to the mask body and that provides support for a filtering structure 18 that resides behind the support structure 16. The filtering structure 18 removes contaminants from the ambient air when a wearer of the respirator 10 inhales. The support structure 16 includes a plastic mesh 20 that is molded into a three-dimensional configuration, which defines the mask body shape. The mesh 20, when in its molded configuration, can provide the structural integrity sufficient for the mask body 12 to retain its intended configuration. The filtering structure 18 may be secured to the support structure 16 at the mask body perimeter 22. The filtering structure 18 also may be secured to the support structure 16 at the apex 23 of the mask body when an exhalation valve (not shown) is secured thereto. The bonding of the mesh 20 to the filtering structure at the perimeter 22 and at the apex 23 may be achieved through ultrasonic welding. Between the perimeter 22 and the apex 23 is the mid region 24 where the mesh and the filtering structure are bonded to each other through thermal bonds between the mesh material and the melt-blown fibers that are present in the outer cover web. As indicated above, the outer cover web comprises melt-blown fibers and staple fibers. At least the melt-blown fibers are bonded to the mesh material. The melt-blown fibers become bonded to the mesh material since they typically have a lower melting point than the fibers that constitute the staple fibers and share a melting point similar to the plastic materials that constitute the mesh. The staple fibers typically are commonly provided to preserve loft or decrease web solidity. The staple fibers, however, also may be made from a polymeric material that has a similar melting point to the polymeric material of the mesh. If desired, the outer cover web may be a prefilter that removes contaminants from the air before the air passes through the filtering layer of the filtering structure. The harness 14 may include one or more straps 25 that enable the mask body 12 to be supported over the nose and mouth of a person. Adjustable buckles may be provided on the harness 14 to allow the straps 25 to be adjusted in length. Fastening or clasping mechanisms also may be attached to the straps 25 to allow the harness 14 to be disassembled when removing the respirator 10 from a person's face and reassembled when donning the respirator 10 onto a person's face.

Figure 4:
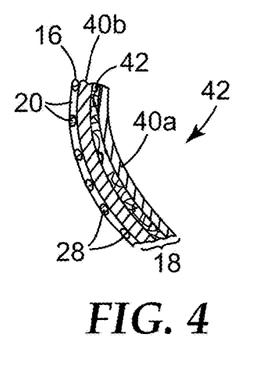
FIG. 4 is a cross-section of the mask body 12 shown in FIG. 3.

FIG. 4 shows a cross-section of the mask body 12, which includes the support structure 16 and the filtering structure 18. The support structure 16 comprises a mesh 20, and the filtering structure 18 comprises one or more layers including a filtering layer.

The Mesh:

The mesh 20 resides on an outer surface of the mask body 12 and may be made from a variety of polymeric materials. Polymers suitable for mesh formation are thermoplastic materials. The polymeric materials used to make the plastic mesh typically have a Young's modulus of about 14 to 7000 Mega Pascals (MPa), more typically 1500 to 3000 MPa. Thermoplastic materials melt and/or flow upon the application of heat, resolidify upon cooling, and again melt and/or flow upon the application of heat. The thermoplastic material generally undergoes only a physical change upon heating and cooling: no appreciable chemical change occurs. Examples of thermoplastic polymers that can be used to form meshes of the present invention include: polyethylene-vinyl acetate (EVA), polyolefins (e.g., polypropylene and polyethylene), polyvinyl chloride, polystyrene, nylons, polyesters (e.g., polyethylene terephthalate), and elastomeric polymers, (e.g., ABA block copolymers, polyurethanes, polyolefin elastomers, polyurethane elastomers, metallocene polyolefin elastomers, polyamide elastomers, ethylene vinyl acetate elastomers, and polyester elastomers). Blends of two or more materials also may be used in the manufacture of meshes. Examples of such blends include: polypropylene/EVA and polythylene/EVA. Polypropylene may be preferred for use in the plastic mesh since melt-blown fibers are regularly made from polypropylene. Use of similar polymers enables proper welding of the support structure to the filtering structure. Mesh webs that exhibit hexagonal or octagonal shapes in the individual cells generally do not exhibit substantial distortion upon being molded. The cells typically occupy an area of about 20 to 40 square millimeters. The mesh 20 that comprises the support structure 16 typically has a thickness of about 0.5 to 2.0 millimeters (mm), and the strands 28 that comprise the mesh 20 typically have an average cross-sectional area of about 0.2 to 3.2 $mm^2$, more typically of about 0.3 to 1.2 $mm^2$. The melting temperature of the mesh typically is about 130 to 170° C., more typically 140 to 160°. The melting point may be measured in accordance with differential scanning calorimetry.

The Filtering Structure:

As shown in FIG. 4, the filtering structure 18 may include one or more cover webs 40a and 40b and a filtration layer 42. The cover webs 40a and 40b may be located on opposing sides of the filtration layer 42 to capture any fibers that could come loose therefrom. Typically, the inner cover web 40a is made from a selection of fibers that provide a comfortable feel, particularly on the side of the filtering structure 18 that makes contact with the wearer's face.

The Inner Cover Web:

The inner cover web can be used to entrap fibers that may come loose from the mask body and for comfort reasons. The inner cover web typically does not provide any substantial filtering benefits to the filtering structure. The inner cover web preferably has a comparatively low basis weight and is formed from comparatively fine fibers. More particularly, the inner cover web may be fashioned to have a basis weight of about 5 to 50 g/m² (typically 10 to 30 g/m²), and the fibers may be less than 3.5 denier, typically less than 2 denier, and more typically less than 1 denier but greater than 0.1 denier. Fibers used in the inner cover web often have an average fiber diameter of about 5 to 24 micrometers, typically of about 7 to 18 micrometers, and more typically of about 8 to 12 micrometers. The cover web material may have a degree of elasticity, typically, but not necessarily, 100 to 200% at break, and may be plastically deformable.

Suitable materials for the inner cover web may be blown microfiber (BMF) materials, particularly polyolefin BMF materials, for example polypropylene BMF materials (including polypropylene blends and also blends of polypropylene and polyethylene). An inner cover web can be pre-made as described in U.S. Pat. No. 4,013,816 to Sabee et al. The pre-made web may be formed by collecting the fibers on a smooth surface, typically a smooth-surfaced drum or a rotating collector—see U.S. Pat. No. 6,492,286 to Berrigan et al. Spunbond fibers also may be used in assembling an inner cover webs according to the invention.

A typical inner cover web may be made from polypropylene or a polypropylene/polyolefin blend that contains 50 weight percent or more polypropylene. These materials have been found to offer high degrees of softness and comfort to the wearer and also, when the filter material is a polypropylene BMF material, to remain secured to the filter material without requiring an adhesive between the layers. Polyolefin materials that are suitable for use in an inner cover web may include, for example, a single polypropylene, blends of two polypropylenes, and blends of polypropylene and polyethylene, blends of polypropylene and poly(4-methyl-1-pentene), and/or blends of polypropylene and polybutylene. One example of a fiber for the cover web is a polypropylene BMF made from the polypropylene resin "Escorene 3505G" from Exxon Corporation, providing a basis weight of about 25 g/m² and having a fiber denier in the range 0.2 to 3.1 (with an average, measured over 100 fibers of about 0.8). Another suitable fiber is a polypropylene/polyethylene BMF (produced from a mixture comprising 85 percent of the resin "Escorene 3505G" and 15 percent of the ethylene/alpha-olefin copolymer "Exact 4023" also from Exxon Corporation) providing a basis weight of about 25 g/m² and having an average fiber denier of about 0.8. Suitable spunbond materials are available, under the trade designations "Corosoft Plus 20", "Corosoft Classic 20" and "Corovin PP-S-14", from Corovin GmbH of Peine, Germany, and a carded polypropylene/viscose material available, under the trade designation "370/15", from J. W. Suominen OY of Nakila, Finland. Inner cover webs that are used in the invention generally have very few fibers protruding from the web surface after processing and therefore provide a smooth outer surface—see in U.S. Pat. No. 6,041,782 to Angadjivand, U.S. Pat. No. 6,123,077 to Bostock et al., and WO 96/28216A to Bostock et al.

The Outer Cover Web:

The outer cover web typically contains staple fibers that are distributed throughout and intermingled within the network of melt-blown fibers. The melt-blown fibers may comprise an intermingled mixture of microfibers and mesofibers. These melt-blown fibers contain a polymeric material that has a melting point that is similar to the melting point of the mesh. The melting points typically are within 10° C. of each other. In one embodiment, the web comprises a bimodal mixture of intermingled microfibers and mesofibers. In various embodiments, the microfibers may exhibit a maximum diameter of about 10 micrometers (m), about 8 µm, or about 5 µm. In additional embodiments, the microfibers may exhibit a minimum diameter of about 0.1 µm, 0.5 µm, or 1 µm. In various embodiments, the mesofibers may exhibit a minimum diameter of about 11 µm, about 15 µm, or about 20 µm. The mesofibers also may exhibit a maximum diameter of about 70 µm, 60 µm, or 50 µm. The outer cover web typically has a thickness of about 0.5 to 30 millimeters (mm), more typically about 2.0 to 10 mm.

The populations of microfibers and mesofibers may be characterized according to a fiber frequency histogram which presents the number of fibers of each given diameter (not including staple fibers). Alternatively, the populations may be characterized by a mass frequency histogram which presents the relative mass of the fibers (not including staple fibers) of each given fiber diameter. The melt-blown fibers may be present in a bimodal fiber diameter distribution such that there is present at least one mode of microfibers and at least one mode of mesofibers. Modes may also be present in a mass frequency histogram, and may or may not be the same as the modes present in the fiber frequency histogram. In various embodiments, a bimodal fiber mixture web may exhibit one or more microfiber modes at a fiber diameter of at least about 0.1 µm, 0.5 µm, 1 µm, or 2 µm. The bimodal fiber mixture web may exhibit one or more microfiber modes at a fiber diameter of at most about 10 µm, 8 µm, or 5 µm, or the bimodal fiber mixture web may exhibit a microfiber mode of 1 µm or 2 µm. In various embodiments, a bimodal fiber mixture web may exhibit one or more mesofiber modes at a fiber diameter of at least about 11 µm, 15 µm, or 20 µm and one or more mesofiber modes at a fiber diameter not exceeding about 50 µm, 40 µm, or 30 µm. Such bimodal fiber mixture webs may exhibit at least two modes whose corresponding fiber diameters differ by at least about 50%, 100%, 200%, or 400% of the smaller fiber diameter. Bimodal fiber mixture web histograms may exhibit one or more gaps between a smaller diameter melt-blown fiber population and a larger diameter melt-blown fiber population. The melting point of the melt-blown fibers typically is about 130 to 170° C., more typically 140 to 160° C.

As may be ascertained by viewing, for example, mass frequency histograms, the mesofibers may make up a significant portion of the melt-blown fiber material as measured by weight, and accordingly may provide the web with strength and mechanical integrity. In one embodiment, the mesofibers comprise at least about 30% by weight of the melt-blown fibers. In additional embodiments, the mesofibers comprise at least about 40%, 50%, 60%, or 70% by weight of the melt-blown fibers.

As may be ascertained by viewing, for example, fiber frequency histograms, the microfibers may comprise a majority of the number of fibers in the web, and accordingly may provide the desired ability to entrap fine particles. In one embodiment, there are at least five times as many microfibers as mesofibers. In an alternative embodiment, there are at least ten times as many microfibers as mesofibers; in another embodiment, at least twenty times.

The resins used to make the melt-blown microfibers and mesofibers are commonly of the same polymeric composition. The microfibers and mesofibers may able to melt-bond to each other, either during the melt-blowing process or during a subsequent molding process, depending on the particular conditions used for each process. In an alternative embodiment, the resins used to make the melt-blown fibers (microfibers and mesofibers) are of different polymeric compositions coextruded together.

The resins used to make the microfibers and mesofibers also are commonly of substantially the same melt flow index.

Some examples of fiber-forming resins that may be suitable for melt-blowing include thermoplastic polymers such as polycarbonates, polyesters, polyamides, polyurethanes, block copolymers such as styrene-butadiene-styrene and styrene-isoprene-styrene block copolymers, and polyolefins such as polypropylene, polybutylene, and poly(4-methyl-1-pentene), or combination of such resins. Examples of materials that may be used to make melt-blown fibers are disclosed in U.S. Pat. No. 5,706,804 to Baumann et al.; U.S. Pat. No. 4,419,993 to Peterson; U.S. Reissue Pat. No. Re. 28,102 to Mayhew; U.S. Pat. Nos. 5,472,481 and 5,411,576 to Jones et al.; and U.S. Pat. No. 5,908,598 to Rousseau et al.

For webs that will be charged, the input polymer resin may be essentially any thermoplastic fiber-forming material that will maintain satisfactory electret properties or charge separation. Preferred polymeric fiber-forming materials for chargeable webs are non-conductive resins that have a volume resistivity of $10^{14}$ ohm-centimeters or greater at room temperature (22° C.). Preferably, the volume resistivity is about $10^{16}$ ohm-centimeters or greater. Polymeric fiber-forming materials for use in chargeable webs also preferably are substantially free from components such as antistatic agents that could significantly increase electrical conductivity or otherwise interfere with the ability of the fiber to accept and hold electrostatic charges. Some examples of polymers that may be used in chargeable webs include thermoplastic polymers containing polyolefins such as polyethylene, polypropylene, polybutylene, poly(4-methyl-1-pentene) and cyclic olefin copolymers, and combinations of such polymers. Other polymers that may be used but which may be difficult to charge or which may lose charge rapidly include polycarbonates, block copolymers such as styrene-butadiene-styrene and styrene-isoprene-styrene block copolymers, polyesters such as polyethylene terephthalate, polyamides, polyurethanes, and other polymers that will be familiar to those skilled in the art.

Staple fibers are typically added to a nonwoven web in solidified form. Often, they are made by processes such that the fiber diameter more closely resembles the size of the orifice through which the fiber is extruded. Regardless of their process of manufacture or composition, staple fibers are typically machine cut to a specific predetermined or identifiable length. The length of the staple fibers typically is much less than that of melt-blown fibers, and may be less than 0.6 meters, or less than about 0.3 meters. The staple fibers typically have a length of about 1 to 8 centimeters (cm), more typically about 2.5 cm to 6 cm. The average geometric fiber diameter for the staple fibers is generally greater than about 15 µm on average, and in various embodiments can be greater than 20, 30, 40, or 50 µm. The staple fibers generally have a denier of greater than about 3 grams per 9000 meters (g/9,000 m), and equal to or greater than about 4 g/9,000 m. At the upper limit, the denier is typically less than about 50 g/9,000 m and more commonly is less than about 20 g/9000 m to 15 g/9000 m. The staple fibers are typically made from synthetic polymeric materials. Their composition may be chosen so that they can be melt-bonded to each other and/or to the melt-blown fibers during the molding process used to form the shaped respirator body). They also can be made from materials that do not bond to each other or to the melt-blown fibers during a typical molding process. In various embodiments, the outer cover web comprises at least about 30 weight %, 40 weight %, or 45 weight % staple fibers and 70 weight %, 60 weight % or 45 weight % melt-blown fibers. In additional embodiments, the web may comprise at most about 70 weight %, 60 weight %, or 55 weight % staple fibers and greater than 30 weight %, 40 weight %, or 45 weight % melt-blown fibers.

In certain embodiments in which the staple fiber is not thermally bondable, the bimodal fiber mixture web may offer a superior ability to be molded into a cup-shaped geometry adapted to fit over the nose and mouth of a person without significantly compacting the web. When the staple fiber is thermally bondable, however, greater compaction of the web may occur during a molding process.

Suitable staple fibers may be prepared from polyethylene terephthalate, polyester, polyethylene, polypropylene, copolyester, polyamide, or combinations of one of the foregoing. If bondable, the staple fibers typically retain much of their fiber structure after bonding. The staple fibers may be crimped fibers like the fibers described in U.S. Pat. No. 4,118,531 to Hauser. Crimped fibers may have a continuous wavy, curly, or jagged profile along their length. The staple fibers may comprise crimped fibers that comprise about 10 to 30 crimps per cm. The staple fibers may be single component fibers or multi-component fibers. Examples of commercially available single component fibers that are non-bondable at typically employed molding conditions include T-295, available from Invista Corp of Charlotte, N.C. Examples of commercially available single component thermally bondable staple fibers include T 255, T 259, and T 271, also available from Invista Corp., and Type 410 PETG, Type 110 PETG, available from Foss Manufacturing Inc., of Hampton, N.H. The staple fibers also may be multi-component fibers, where at least one of the components soften during heating to allow the staple fibers to be bonded to each other or to allow the staple fibers to be bonded to melt-blown fibers. The different components may be different types of polymers (e.g. polyester and polypropylene), or may be the same type of polymer but with different melting points. The multi-component fibers may be bicomponent fibers that have a coextensive side-by-side configuration, a coextensive concentric sheath-core configuration, or a coextensive elliptical sheath-core configuration. Examples of bicomponent fibers that may be used as thermally bonded staple fibers include T 254, T 256, available from Invista Corp., polypropylene/polyethylene bicomponent fibers such as (Chisso ES, ESC, EAC, EKC), polypropylene/polypropylene bicomponent fiber (Chisso EPC) and polypropylene/polyethylene-terephthalate bicomponent fiber (Chisso ETC), all available from Chisso Inc. of Osaka, Japan, and Type LMF polyester 50/50 sheath/core staple fiber available from Nan Ya Plastics Corporation of Taipei, Taiwan.

Melt-blown fibers may be prepared by a melt-blowing process as described in, for example, U.S. Pat. No. 4,215,682 to Kubik et al. Typically, melt-blown fibers are very long in comparison to staple fibers. Unlike staple fibers, which typically have a specific or identifiable length, melt-blown fibers typically have an indeterminate length. Although melt-blown fibers are sometimes reported to be discontinuous, the fibers generally are long and entangled sufficiently that it is usually not possible to remove one complete melt-blown fiber from a mass of such fibers or to trace one melt-blown fiber from beginning to end. In addition, the diameter of a solidified melt-blown fiber may differ significantly from (e.g., be much smaller than) the size of a source orifice from which the molten fiber precursor was produced. To provide an outer cover web that acts as a prefilter, upstream to the primary filtering layer, the melt-blown fibers in the outer cover web may be electrically-charged using, for example, the method described in the Kubik et al. patent. Alternatively, corona charging and hydrocharging methods may be used, as described below in the section pertaining to the filter layer, to charge the fibers in the outer cover web. The outer cover web also may be colored as described in U.S. patent application Ser. No. 13/465,840, entitled Respirator Having Mottled Appearance, attorney case number 69780US002 filed on the same day as this patent application.

The Filtering Layer(s):

Filter layers used in a mask body of the invention can be of a particle capture or gas and vapor type. The filter layer also may be a barrier layer that prevents the transfer of liquid from one side of the filter layer to another to prevent, for instance, liquid aerosols or liquid splashes from penetrating the filter layer. Multiple layers of similar or dissimilar filter types may be used to construct the filtration layer of the invention as the application requires. Filters beneficially employed in the mask body of the invention are generally low in pressure drop, for example, less than about 20 to 30 mm $H_2O$ at a face velocity of 13.8 centimeters per second to minimize the breathing work of the mask wearer. Filtration layers additionally are commonly flexible and have sufficient structural integrity so that they do not come apart under expected use conditions. Examples of particle capture filters include one or more webs of fine inorganic fibers (such as fiberglass) or polymeric synthetic fibers. Synthetic fiber webs may include electret charged polymeric microfibers that are produced from processes such as melt-blowing. Polyolefin microfibers formed from polypropylene that are surface fluorinated and electret charged, to produce non-polarized trapped charges, provide particular utility for particulate capture applications. An alternate filter layer may comprise an sorbent component for removing hazardous or odorous gases from the breathing air. Absorbents and/or adsorbents may include powders or granules that are bound in a filter layer by adhesives, binders, or fibrous structures—see U.S. Pat. No. 3,971,373 to Braun. Sorbent materials such as activated carbons, that are chemically treated or not, porous alumna-silica catalyst substrates, and alumna particles are examples of sorbents useful in applications of the invention. U.S. Pat. Nos. 7,309,513 and 7,004,990 to Brey et al., and 5,344,626 to Abler disclose examples of activated carbon that may be suitable.

The filtration layer is typically chosen to achieve a desired filtering effect and, generally, removes a high percentage of particles or other contaminants from the gaseous stream that passes through it. For fibrous filter layers, the fibers selected depend upon the kind of substance to be filtered and, typically, are chosen so that they do not become bonded together during the molding operation. As indicated, the filter layer may come in a variety of shapes and forms. It typically has a thickness of about 0.2 millimeters (mm) to 1 centimeter (cm), more typically about 0.3 mm to 1 cm, and it could be a corrugated web that has an expanded surface area relative to the shaping layer—see, for example, U.S. Pat. Nos. 5,804,295 and 5,656,368 to Braun et al. The filtration layer also may include multiple layers of filter media joined together by an adhesive component—see U.S. Pat. No. 6,923,182 to Angadjivand et al.

Essentially any suitable material that is known (or later developed) for forming a filtering layer may be used as the filtering material. Webs of melt-blown fibers, such as those taught in Wente, Van A., *Superfine Thermoplastic Fibers*, 48 Indus. Engn. Chem., 1342 et seq. (1956), especially when in a persistent electrically charged (electret) form are especially useful (see, for example, U.S. Pat. No. 4,215,682 to Kubik et al.). These melt-blown fibers may be microfibers that have an effective fiber diameter less than about 10 micrometers (m) (referred to as BMF for "blown microfiber"), typically about 1 to 9 μm. Effective fiber diameter may be determined according to Davies, C. N., *The Separation Of Airborne Dust Particles*, Institution Of Mechanical Engineers, London, Proceedings 1B, 1952. Particularly preferred are BMF webs that contain fibers formed from polypropylene, poly(4-methyl-1-pentene), and combinations thereof. Melt-blown webs may be made using the apparatus and die described in U.S. Pat. Nos. 7,690,902, 6,861,025, 6,846,450, and 6,824,733 to Erickson et al. Electrically charged fibrillated-film fibers as taught in van Turnhout, U.S. Pat. RE 31,285, also may be suitable, as well as rosin-wool fibrous webs and webs of glass fibers or solution-blown, or electrostatically sprayed fibers, especially in microfiber form. Nanofiber webs also may be used as a filtering layer—see U.S. Pat. No. 7,691,168 to Fox et al. Electric charge can be imparted to the fibers by contacting the fibers with water as disclosed in U.S. Pat. No. 6,824,718 to Eitzman et al., U.S. Pat. No. 6,783,574 to Angadjivand et al., U.S. Pat. No. 6,743,464 to Insley et al., U.S. Pat. Nos. 6,454,986 and 6,406,657 to Eitzman et al., and U.S. Pat. Nos. 6,375,886 and 5,496,507 to Angadjivand et al. Electric charge also may be imparted to the fibers by corona charging as disclosed in U.S. Pat. No. 4,588,537 to Klasse et al. or by tribocharging as disclosed in U.S. Pat. No. 4,798,850 to Brown. Also, additives can be included in the fibers to enhance the filtration performance of webs produced through the hydrocharging process (see U.S. Pat. No. 5,908,598 to Rousseau et al.). Fluorine atoms, in particular, can be disposed at the surface of the fibers in the filter layer to improve filtration performance in an oily mist environment—see U.S. Pat. Nos. 5,025,052 and 5,099,026 to Crater et al.; U.S. Pat. Nos. 6,398,847 B1, 6,397,458 B1, and 6,409,806 B1 to Jones et al.; U.S. Pat. No. 7,244,292 to Kirk et al.; U.S. Pat. No. 7,244,291 to Spartz et al.; and U.S. Pat. No. 7,765,698 to Sebastian et al. Typical basis weights for electret BMF filtration layers are about 10 to 100 grams per square meter ($g/m^2$). When electrically charged and optionally fluorinated as mentioned above, the basis weight may be about 30 to 200 $g/m^2$ and about 40 to 80 $g/m^2$, respectively.

Respirator Components:

The strap(s) that are used in the harness may be made from a variety of materials, such as thermoset rubbers, thermoplastic elastomers, braided or knitted yarn/rubber combinations, inelastic braided components, and the like. The strap(s) may be made from an elastic material such as an elastic braided material. The strap preferably can be expanded to greater than twice its total length and be returned to its relaxed state. The strap(s) also could possibly be increased to three or four times its relaxed state length and can be returned to its original condition without any damage thereto when the tensile forces are removed. The elastic limit thus is generally not less than two, three, or four times the length of the strap when in its relaxed state. Typically, the strap(s) are about 20 to 30 cm long, 3 to 10 mm wide, and about 0.9 to 1.5 mm thick. An example of a strap that may be used in connection with the present invention is shown in U.S. Pat. No. 6,332,465 to Xue et al. Examples of a fastening or clasping mechanism that may be used to joint one or more parts of the strap together is shown, for example, in the following U.S. Pat. No. 6,062,221 to Brostrom et al., U.S. Pat. No. 5,237,986 to Seppala, and EP1,495,785A1 to Chien and in U.S. Patent Publication 2009/0193628A1 to Gebrewold et al. and International Publication WO2009/038956A2 to Stepan et al.

An exhalation valve may be attached to the mask body to facilitate purging exhaled air from the interior gas space. An exhalation valve may improve wearer comfort by rapidly removing the warm moist exhaled air from the mask interior. See, for example, U.S. Pat. Nos. 7,188,622, 7,028,689, and 7,013,895 to Martin et al.; U.S. Pat. Nos. 7,493,900, 7,428, 903, 7,311,104, 7,117,868, 6,854,463, 6,843,248, and 5,325, 892 to Japuntich et al.; U.S. Pat. Nos. 7,849,856 and 6,883,518 to Mittelstadt et al.; and RE 37,974 to Bowers. Essentially any exhalation valve that provides a suitable pressure drop and that can be properly secured to the mask body may be used in connection with the present invention to rapidly deliver exhaled air from the interior gas space to the exterior gas space.

To improve fit and wearer comfort, an elastomeric face seal can be secured to the perimeter of the filtering structure. Such a face seal may extend radially inward to contact the wearer's face when the respirator is being donned. Examples of face seals are described in U.S. Pat. No. 6,568,392 to Bostock et al., U.S. Pat. No. 5,617,849 to Springett et al., and U.S. Pat. No. 4,600,002 to Maryyanek et al., and in Canadian Patent 1,296,487 to Yard. The inventive filtering face-piece respirator may be made by a method that comprises: (a) providing a filtering structure that comprises: an inner cover web; an outer cover web that comprises melt-blown fibers and staple fibers, the melt-blown fibers comprising a polymeric material that has a first melting point; and a filtration layer that is located between the inner and outer cover webs; (b) providing a plastic mesh that contains a polymeric material that has a second melting point similar to the first melting point: and (c) molding the filtering structure and the plastic mesh in a mold in a face-to-face relationship such that the outer cover web of the filtering structure becomes joined to the plastic mesh in the mid region of the mask body. The mask body may be molded, for example, using the processes mentioned and described in U.S. Pat. No. 7,131,442B1 to Kronzer et al., U.S. Pat. No. 4,807,619 to Dyrud et al., and U.S. Pat. No. 4,536,440 to Berg. Alternatively, a filtering face-piece respirator can be made by a method that comprises: (a) providing filtering pre-form that comprises an inner cover web and a filtration layer; (b) providing a combined structure that has a molded plastic mesh joined to an outer cover web; and (c) inserting the filtering pre-form into the molded plastic mesh and welding the pre-form to the combined structure at least at the perimeter. In making a cup-shaped mask construction, where an outer mesh layer is employed, a pre-formed cup-shaped filtration layer may be prepared. Such a pre-form can be made by first juxtapositioning the inner cover web and filter layer together. The layered structure may then be folded in half to form a stacked layered structure that has the filtration layer constituting the outer two layers. The assembly is typically subjected to a heat-sealing procedure to form a generally sinusoidal wave form bond across approximately the upper one quarter of the assembly (near the fold)—see, for example, U.S. Pat. No. 4,807,619 to Dyrud et al. The waste material between the bond line and the fold may be trimmed, and the resultant layered structure then opened to form a substantially cup-shaped, pre-formed filtration body that has an inner sublayer of the cover web and an outer filter layer. The pre-form can then be placed within a molded mesh/outer cover web combination to complete the layers constituting the mask body.

The mask body that is used in connection with the present invention may take on a variety of different shapes and configurations. Although a filtering structure has been illustrated with multiple layers that include a filtration layer and two cover webs, the filtering structure may comprise a combination of these layers and other layers or with modifications as needed. As indicated above, an electret pre-filter may be disposed upstream to a more refined and selective downstream filtration layer. Additionally, sorptive materials such as activated carbon may be disposed between the fibers and/or various layers that comprise the filtering structure. Further, separate particulate filtration layers may be used in conjunction with sorptive layers to provide filtration for both particulates and vapors. The filtering structure could have one or more horizontal and/or vertical lines of demarcation (such as a weld line or fold line) that contribute to its structural integrity.

EXAMPLE

Example 1

The melt-blown fibers that are used in the outer cover web were formed from polypropylene that was fed to a single screw extruder. The extruder had a 20:1 length/diameter ratio and a 3:1 compression ratio. A Zenith 10 cubic centimeter per revolution (cc/rev) melt pump metered the flow of polymer to a 50.8 cm wide drilled orifice melt-blowing die. The die, which originally contained 0.3 mm diameter orifices, had been modified by drilling out every 9th orifice to 0.6 mm, thereby providing a 9:1 ratio of the number of smaller size to larger size holes and a 2:1 ratio of larger hole size to smaller hole size. This die design served to deliver a nominal ratio of total larger-diameter fiber extrudate to total smaller-diameter fiber extrudate of approximately 60/40 by volume. The line of orifices had 10 holes/cm hole spacing. Heated air was used to attenuate the fibers at the die tip. An airknife was positioned at a 0.5 millimeter (mm) negative set back from the die tip and a 0.76 mm air gap. No to moderate vacuum was pulled through a medium mesh collector screen at the point of web formation. The polymer output rate from the extruder was about 0.18 kilogram per centimeter per hour (kg/cm/hr), the DCD (die-to-collector distance) was about 53 cm, and the air pressure was adjusted as desired. A web with the following properties was produced by adjusting the process. A flow rate of 32 liters per minute (lpm) was used to measure the pressure drop ($\Delta P$) and to calculate the Effective Fiber Diameter (EFD) and web Solidity:

$\Delta P$=0.47 mmH$_2$O
Basis weight=1.05 g/5¼" circle (75 gsm)
EFD=19 micrometers
Thickness=33 mil (0.84 mm)
Solidity=9.9%

A staple fiber addition unit was then started, and the combination web was formed comprising melt-blown fibers made according to the above conditions and staple fibers that were introduced into the melt-blown fiber stream. The staple fibers comprised a 15 denier polyester and were introduced so as to form a mixed fiber web comprising approximately 50% by weight melt-blown fibers and 50% by weight staple fibers.

The combination web properties after adding the staple fiber were as follows:

$\Delta P$=0.20 mmH$_2$O
Basis weight=2.2 g/5¼" circle (158 gsm)
EFD=32 micrometers
Thickness=205 mil (5.2 mm)
Solidity=3.3%

The following construction was used to make a respirator.

Respirator Construction:

First layer: Thermoplastic PP mesh, thickness of 36 mil (0.91 mm), hexagonal design;

Second layer: 1 layer of an outer cover web (combination web made as described above);

Third layer: 2 layers BMF Filter media.

Fourth layer: 1 layer inner cover web (next to the face) containing spunbond polypropylene 0.75 oz.

The BMF filter web had a basis weight of 0.8 g/5.25" Circle (57 grams per square meter), fiber size of 9 micrometers EFD. The blown microfiber web was made from polypropylene and was corona treated and hydrocharged as described in the U.S. Pat. No. 5,496,507 to Angadjivand et al.

The above-mentioned construction was then molded together to make a finished respirator. The respirator was molded such that the thermoplastic mesh layer was toward the convex outer side of the respirator, relative to the filter media and cover web layer in the inner concave side. A mask body was assembled by combining two separately formed components: a cup-shaped component of mesh joined to an outer cover web and a filter pre-form component. The cup-shaped component was formed by laminating a 25 cm by 25 cm piece of mesh with a layer of combination web outer cover web. The mesh had a hexagonal pattern, with each hexagon occupying about 31.8 mm$^2$. Molding of the mesh and outer cover web laminate was done by placing the laminate between mating parts of a hemispherical cup-shaped heated mold (mesh side away from the convex hemisphere molding surface) and closing the mold to a pre-defined gap for specified dwell time. The hemispherical-shaped male half of the mold had a height of about 55 mm and a volume of about 310 cm$^3$. With the mold temperature maintained at about 115° C., the laminate was placed in position, and the heated mold was closed to a gap of approximately 1.27 mm and held for a dwell time of approximately 15 seconds. After the dwell time was reached, the mold was opened, and the molded product was removed and trimmed manually.

A pre-formed cup-shaped filtration layer or body was prepared by first laying a 20 cm by 25 cm piece of inner coverweb over two similarly sized pieces of BMF filter media. The three layer laminate was folded in half to form an approximate 12.7 cm by 20 cm, six-layer stacked laminate structure with the filtration web constituting the outer layers of the stacked laminate. The assembly was then subjected to a heat-sealing procedure to form a generally sinusoidal wave form bond across approximately the upper one quarter of the assembly (near the fold). The waste material between the bond line and the fold was trimmed and the resultant laminate structure was then opened to form a substantially cup-shaped, pre-formed filtration body having an inner sublayer of coverweb and an outer sublayer of the BMF filter media.

In the final step of assembly, the pre-form was opened to its cup shape configuration and fitted into the concave side of the cup-shaped component of mesh joined to an outer cover web. With the BMF filter media surface of the pre-form inserted into the molded cup-shaped component, the perimeter of the mask body was fused, by ultrasonic bonding of the perimeter edge, to permanently join the assembly components. Upon examination, it was observed that the outer cover web was in coextensive and intimate contact with the mesh over essentially the whole mask body inward from the perimeter.

Figure 5:
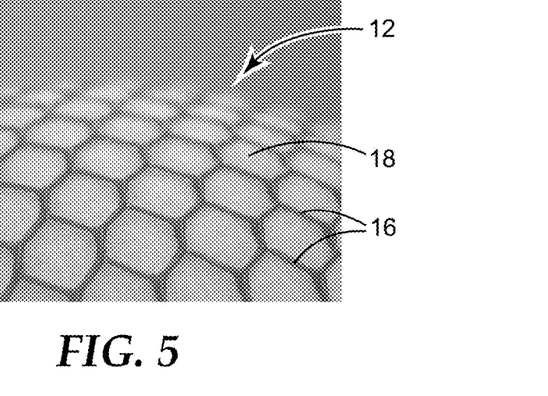
FIG. 5 shows an enlarged photograph taken from the side of the mask body 12 of the present invention.

FIG. 5 shows a photograph of a mask body 12 made as described above where the filtering structure 18 is joined to the support structure 16. As illustrated, the close contact between the filtering structure and the mesh provides an improved appearance to the resulting product. The harness may be attached to the mask body using any of the techniques described above.

This invention may take on various modifications and alterations without departing from its spirit and scope. Accordingly, this invention is not limited to the above-described but is to be controlled by the limitations set forth in the following claims and any equivalents thereof.

This invention also may be suitably practiced in the absence of any element not specifically disclosed herein.

All patents and patent applications cited above, including those in the Background section, are incorporated by reference into this document in total. To the extent there is a conflict or discrepancy between the disclosure in such incorporated document and the above specification, the above specification will control.

What is claimed is:

1. A method of making a filtering face-piece respirator, which method comprises:
    (a) providing filtering pre-form that comprises an inner cover web and a filtration layer;
    (b) providing a combined structure that has a molded plastic mesh joined to an outer cover web; and
    (c) inserting the filtering pre-form into the molded plastic mesh and welding the pre-form to the combined structure at least at the perimeter.

2. The method of claim 1, further comprising electrically charging microfibers of the outer cover web.

3. The method of claim 1, wherein the molded plastic mesh is laminated to the outer cover web.

4. The method of claim 1, wherein welding the pre-form to the combined structure comprises ultrasonically bonding the pre-form to the combined structure at least at the perimeter.

5. The method of claim 1, wherein the outer cover web is coextensive and in intimate contact with the molded plastic mesh over the whole mask body inward from the perimeter.

6. The method of claim 1, wherein providing the filtering pre-form comprises:
    disposing the inner cover web on two layers of filter media to form a three-layer laminate;
    folding the three-layer laminate in half along a fold to form a six-layer stacked laminate structure, wherein the filter media provides outer layers of the stacked laminate structure;
    bonding the stacked laminate structure together to form a bond and the filtration layer;
    removing portions of the inner cover web and filter media between the bond and the fold; and
    unfolding the stacked laminate structure to provide the pre-form.

7. The method of claim 6, wherein the bond comprises a sinusoidal wave form bond.

8. The method of claim 1, wherein the mesh contains cells that each have a hexagonal shape.

9. The method of claim 1, wherein the mesh has a hexagonal or octagonal pattern.

10. The method of claim 1, wherein the mesh has a hexagonal pattern.

11. The method of claim 10, wherein each hexagon occupies an area of 20 to 40 square millimeters.

12. The method of claim 11, wherein the mesh comprises strands that have an average cross-sectional area of 0.2 to 3.2 mm$^2$.

13. The method of claim 1, wherein the molded plastic mesh and melt-blown fibers of the outer cover web contain polypropylene.

14. The method of claim 1, wherein the outer cover web comprises melt-blown fibers and staple fibers, the melt-blown fibers comprising a polymeric material that has a first melting point.

15. The method of claim 14, wherein the plastic mesh contains a polymeric material that has a second melting point similar to the first melting point.

16. The method of claim 15, wherein the first melting point is 130 to 170° C.

17. The method of claim 16, wherein the second melting point is 130 to 170° C.

18. The method of claim 15, wherein the first and second melting points are within 10° C. or less of each other.

19. The method of claim 1, wherein the filtration layer comprises sorptive materials disposed between fibers of the filtration layer.

20. The method of claim 1, wherein the filtering pre-form further comprises a sorptive layer.

\* \* \* \* \*

UNITED STATES PATENT AND TRADEMARK OFFICE
CERTIFICATE OF CORRECTION

PATENT NO. : 10,245,537 B2  
APPLICATION NO. : 13/465827  
DATED : April 2, 2019  
INVENTOR(S) : Seyed Abol Hassan Angadjivand et al.

Page 1 of 1

It is certified that error appears in the above-identified patent and that said Letters Patent is hereby corrected as shown below:

On the Title Page

Item (71), please add the applicant information as follows:  
--3M Innovative Properties Company--

Signed and Sealed this  
Twenty-fifth Day of February, 2020

Andrei Iancu  
*Director of the United States Patent and Trademark Office*